March 17, 1970  B. W. BRADLEY  3,500,930
PERMANENTLY PLUGGING THIEF ZONES BETWEEN
TEMPORARY FROZEN PLUG AREAS Filed Sept. 18, 1968  2 Sheets-Sheet 1

INVENTOR
B. W. BRADLEY
BY:
HIS ATTORNEY

United States Patent Office 3,500,930
Patented Mar. 17, 1970

3,500,930
PERMANENTLY PLUGGING THIEF ZONES BETWEEN TEMPORARY FROZEN PLUG AREAS
Bryant W. Bradley, Houston, Tex., assignor to Shell Oil Company, New York, N.Y., a corporation of Delaware
Continuation-in-part of application Ser. No. 648,350, June 23, 1967. This application Sept. 18, 1968, Ser. No. 760,463
Int. Cl. E21b *33/13*
U.S. Cl. 166—295       6 Claims

ABSTRACT OF THE DISCLOSURE

A process for recovering oil from underground formations containing thief non-productive zones comprising temporarily isolating the oil-productive zone(s) by freezing a thermally solidifiable liquid while maintaining a channel of communication with the thief non-productive zone(s) and thereafter plugging the thief non-productive zone(s) with a permanent plugging material, removing the temporary frozen plug from the oil-productive zone(s) by suitable means and recovering oil therefrom.

CROSS-REFERENCE TO RELATED APPLICATION

This application is a continuation-in-part of copending application Ser. No. 648,350, filed June 23, 1967 and which matured as U.S. Patent 3,439,744 on Apr. 22, 1969.

BACKGROUND OF THE INVENTION

This invention is directed to a new, novel and improved process for recovering economically and effectively oil or other fluidizable material from underground formations having heterogeneous permeability by temporarily isolating, plugging or sealing the oil-productive zone or zones with a freezable liquid accomplished by withdrawing heat therefrom by mechanical refrigerating means while maintaining a channel of fluid communication with zones to be permanently plugged, subsequently injecting into said zones a permanent plugging material, thereafter removing the temporary frozen plug from the oil-productive zone, or from the interval between the thief zone and oil-productive zone, and finally recovering oil therefrom by suitable means such as by injecting a fluid drive into the oil-productive zone to recover therefrom oil by either backflow or injection-production techniques.

DESCRIPTION OF THE PRIOR ART

The problem of selective plugging of formations to improve oil recovery is well known in the art as evidenced by reference to U.S. Patents 2,864,448; 2,801,699; 2,787,325; 3,261,400 and 3,141,503. In general, the entire permeable zone is plugged to some extent with a uniform plugging material and thereafter the less permeable zones are treated in a suitable manner so as to render them more permeable such as by acid treatment or the like. Under these conditions it becomes a difficult and costly procedure to subsequently remove the plugging material from desired productive zones for subsequent treatment for recovery of oil therefrom.

In many situations it is common practice to drill through all productive zones, such as oil-productive zones, cement and perforate casing so as to produce all zones simultaneously. In other cases, sand production is a problem and special liners or gravel packs to exclude sand are hung through the productive intervals or zones rather than or in addition to cementing and porforating casing. In the latter completions, it is often very difficult, if not impossible, to successfully conduct secondary recovery operations when one of the zones is more permeable than other portions of the oil sand. As a result, a displacing fluid such as steam, gas or water that is injected to fluidize and/or displace a fluidizable material such as oil, tar, shale oil, sulfur or the like, channels quickly through the thief zone or depleted permeable zones giving poor displacement in the remainder of the productive interval.

In formations with thief zones, it is generally necessary to inject a compound into the permeable section in the vicinity of the bore-hole to create a permanent plug. However, this is very difficult to do because communication behind the liner permits the plugging agent to flow into the oil sands where plugging is not desired. Mechanical means or use of fluids of varying viscosities and gel-set times to control the flow of plugging agents behind the liner are generally unsuccessful and in addition are costly and difficult to control and place.

OBJECTS OF THE PRESENT INVENTION

It is an object of the present invention to recover oil or other materials from underground productive zones, such as oil-bearing zone(s) by an improved process of selectively, permanently plugging or isolating nonproductive permeable zone(s) without plugging the oil-productive zone(s).

Still another object of the present invention is to permanently plug thief zones without having the plugging material coming in contact with or flowing into the productive zones.

Still another object of the present invention is to temporarily plug the productive zones with a heat dissolvable plugging material and thereafter permanently plugging the thief zones and non-productive permeable zones of the formation.

Still another object of the present invention is to recover oil from oil-productive zones of a formation using fluid drives by first temporarily plugging the oil-productive zone(s) or the channel(s) of fluid access to such zone(s) with a freezable material accomplished by heat withdrawal therefrom and subsequently subjected to dissolution by heat, permanently plugging the thief and/or non-productive permeable zones with permanent plugging materials such as cement, resins, etc., and thereafter removing the temporary plug by dissolution such as by heating or thawing and finally recovering oil therefrom by suitable means such as by a fluid drive injected into said oil-production zones through an injection well by using backflow or injection-production techniques.

SUMMARY OF THE INVENTION

The process of the present invention comprises improving the recovery of a fluidizable material by preventing flow of plugging agents destined for plugging thief zones or depleted or non-productive permeable zones of an earth formation, from entering the productive zones of the formation, by first temporarily freezing said productive zones, or isolating said zone by frozen plugs formed in the bore hole, with suitable freezable liquid injection injected into or into contact with said zones and thereafter accomplishing the freezing by withdrawing heat from said liquid at a selected rate while maintaining a channel of fluid in communication with the thief and/or non-productive zones thereby forming a temporary frozen plug which prevents the subsequent injected permanent plugging agents from entering the productive zones and allows the permanent plugging agents to enter into only the thief or non-productive zones. The thief non-productive zones can be thus permanently plugged with plugging materials such as cement or polymeric resins or other types of suitable materials as described in U.S. Patents 3,308,- 884; 3,261,400; 3,251,414; 2,864,448; 2,801,669 or the ke. The temporary frozen plug is removed by suitale means such as by chemical action or heating to render aid oil-productive zone susceptible to oil recovery treatnent without loss of driving fluids into the plugged thief ones or other areas of the formation.

To accomplish the essence of the process of the present nvention the essential steps comprise:

(a) Disposing a freezable fluid, which is a thermally-olidifiable liquid material, e.g., water, brine or heavy oil, n a well borehole adjacent to a permeable earth formation which is not to be permanently plugged but is loated behind a permeable conduit that extends along a elected permeable earth formation that is to be plugged This can be accomplished by spotting and freezing a hermally-solidifiable liquid within at least one portion of he borehole and in or in contact with the surrounding arth formations at least one depth other than, but adacent to, the depth of a layer of earth formation to be lugged;

(b) Determining the rate at which the freezable fluid an be frozen in situ when heat is withdrawn from it at a elected rate;

(c) Withdrawing heat from the freezable fluid at the elected rate while maintaining fluid in a conduit that exends from a surface location to the earth formation to be lugged and maintaining the temperature in the conduit bove the freezing temperature of the fluid in the conduit;

(d) Terminating or significantly reducing the rate of he withdrawing of heat when the freezing of fluid in he borehole has isolated the earth formation to be lugged from fluid communication with fluid in portions of the borehole other than said conduit that extends from a surface location to the earth formation to be plugged;

(e) Flowing materials such as cement or other chemically-solidifiable liquid material such as resin or resinforming materials adapted to plug an earth formation hrough said conduit that extends from a surface location o the so-isolated earth formation to be plugged and plugzing the earth formation by allowing the chemically-solidifiable material to solidify in or in contact with the interstices of the layer while maintaining the frozen fluid, i.e., the frozen thermally-solidifiable liquid, in a frozen state and a fixed position, and subsequently (f) Melting or thawing and displacing the frozen fluid, i.e., the frozen thermally-solidifiable liquid, to re-establish fluid communication between the borehole and the unplugged portion of the surrounding earth formation;

(g) And finally recovering fluidizable material therefrom by suitable means, e.g., a drive fluid.

Step (a) can be accomplished by various procedures. A readily freezable liquid, such as water, can be displaced into a borehole and frozen by withdrawing heat.

In step (b) the freezing-rate determination can be based on withdrawing heat and then checking, e.g., by inserting a probe, measuring injectivity, measuring temperature, or the like, to determine the size of the frozen plug.

In step (c) the heat can be withdrawn by circulating a refrigerant such as lower hydrocarbons, e.g., propane, butane, or ammonia or carbon dioxide, sulfur dioxide or fluorochloro methanes such as "Freon" that is cooled by circulating preferably through insulated conduits a fluid that is cooled at a surface location, e.g., a chilled brine or a slurry of ice.

In step (d) the chilling is stopped after the determined time.

In step (e) the plugging materials can advantageously be selected by the thief-zone-classifying process described in patent application Ser. No. 693,404, filed Dec. 26, 1967 so that a bridging material such as cement can be injected when the thief zone is cavernous, and a penetrating material such as an epoxy resin can be injected when the thief zone has a high-matrix permeability. The thief-zone-classifying process of the pending application comprises:

(1) measuring the depth within the hole of at least one zone in which the injectivity into the surrounding earth formation is relatively high; (2) measuring the radioactivity with depth that is produced by injecting fluid containing solid radioactive material through the hole and into the surrounding earth formation; and (3) reducing the permeability of a zone of relatively high permeability by selectively injecting a liquid solution capable of penetrating into and forming plugging material within the pores of any porous earth formation where the radioactivity measures relatively high along said zone and injecting a liquid suspension of particles that are capable of bridging across and sealing off any cavernous areas when the radioactivity measures substantially nominal along said zone.

In step (e) the slug of chemically solidifiable liquid material can be displaced out of the borehole by displacing it with a non-solidifiable liquid that is injected in a volume sufficient to extend through the tool, the perforated casing or liner, and surrounding gravel pack, to at least the face of the surrounding earth formation. A slight over-displacement is not serious, since the thief zone becomes plugged by a ring-shaped plug within the thief zone. The displacing fluid can comprise either (a) a volume of clear liquid that is adjusted to fill the injection conduit and plug-isolated portion of the borehole or (b) a drilling mud or well completion fluid that forms a removable, impermeable-sheath on the face of the earth formation. Particularly suitable sheath-forming fluids comprise well completion fluids as described in copending patent application Ser. No. 748,166, filed July 29, 1968, in which the carrier base can be water or an oil-water emulsion. A particularly useful well completion fluid comprises an aqueous solution of a nonionic polymer polyoxyethylene and finely divided calcium carbonate (referred to below as "Polychalk") have been found to possess very favorable properties for use as workover or completion fluids as well as for use in hydraulic fracturing. The filter cake formed from "Polychalk" can be removed by a small amount of acid or by reverse flow, and the filtrate is non-damaging to a wide variety of core types ranging from 4 md. limestone to 2,400 md. sandstone. "Polychalk" has been found to produce a significant improvement over similar chalk systems that contain hydroxyethyl cellulose, carboxymethyl cellulose, partially hydrolyzed polyacrylamide, guar gum or the like materials to control the rheological properties of the system.

An essential distinguishing feature of the present invention is that the frozen plugs are fixed in position and kept frozen by means of the cooling or refrigerant device, e.g., cooling coils, in the well (as shown in FIGURES 2, 3 and 4) in order to isolate the thief non-protuctive zones while they are being permanently plugged with cement or other chemically solidifiable plugs.

In the preferred embodiment of the present invention wherein the productive zones are temporarily isolated with ice plugs, it is desirable to thermally insulate the conduit that extends through the upper plug and to allow the ice that forms the plug to extend around cooling coils that are mechanically anchored against vertical displacement.

The parent case suggests neither the sequential use of thermally and chemically solidifiable materials nor the use of a thermally insulated conduit extending through an upper plug that has a melting point below the ambient temperature.

BRIEF DESCRIPTION OF THE DRAWING

The method of this invention is further illustrated by reference to the drawings in which corresponding parts in each of said drawings are referred by like numerals.

FIGURE 1 illustrates the general problem encountered when a well borehole penetrates a formation 10 containing a permeable oil zone 11 and a thief zone 12. In oil zone 11 a highly permeable zone 11a and 11b is present which normally is suspectible to plugging when such formations are treated for permanent plugging of a thief zone 12. The well construction is of the conventional type wherein the borehole 13 penetrates the formation 10, said borehole having a casing shoe 14, and a liner 15, a packer 16 through which is penetrated a treating tube 17 for injection of plugging agent into the thief zone 12. In this illustration the sand fill 18 used to protect the oil zone is shown as having failed to fill the liner-formation annulus 19 and the cement cap 20 collapsed due to lack of support. The permanent plugging agent 21 later failed to completely plug the thief zone 12 while damaging valuable oil sand formation 11a.

Figure 1:
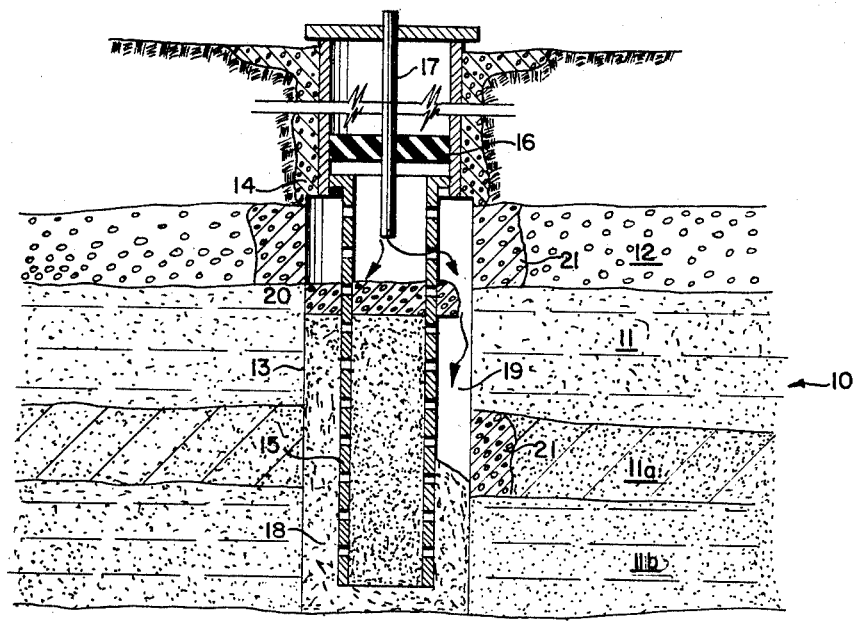
Figure 2:
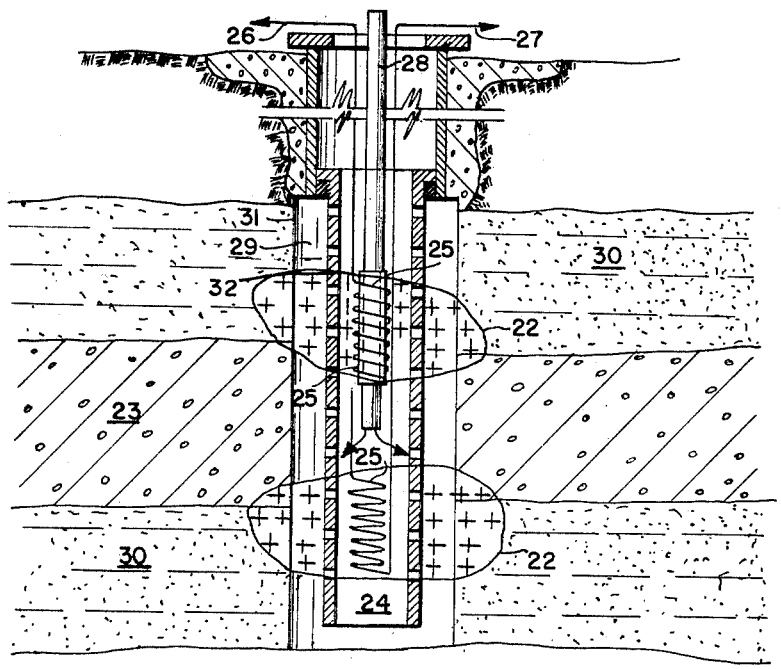
Figure 3:
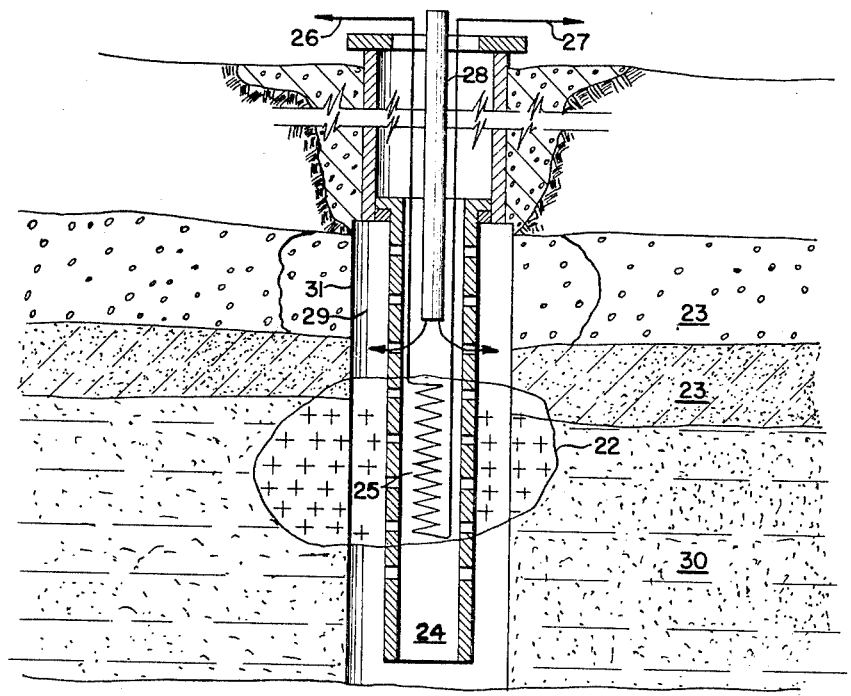

In addition to reliably plugging an upper thief zone of the type shown in FIGURE 1, bottom thief zones or intermediate thief zones as shown in FIGURES 2 and 3 can be sealed off by the process of this invention, for example, to prevent water entry and the like into the oil-productive zone without also sealing or plugging portions of the oil-producing zones.

Figure 4:
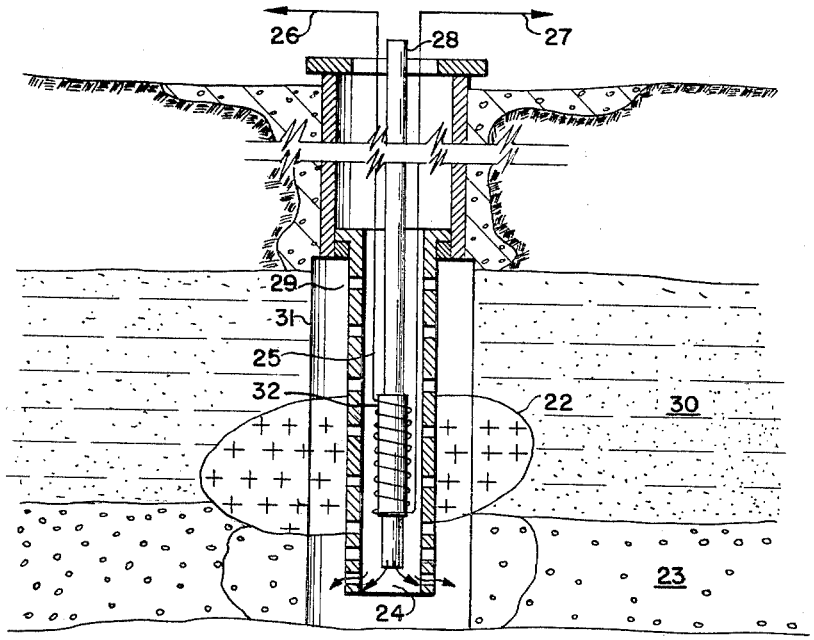

FIGURES 2–4 illustrate the result of formation treatment by the process of the present invention wherein the formation of temporary plug(s) used to isolate the thief zone is accomplished by means of freezing coils placed in the borehole at desired locations therein so as to form a temporary plug by heat removal from the freezable fluid. The so-isolated thief zone is then plugged by injecting a permanent plugging agent into the thief zone via a treating tubing.

Specifically, FIGURE 2 illustrates the use of ice plugs 22 to isolate a water 24 injection well thief zone 23. Freezing coils 25 are shown in place at the top and bottom of the thief zone 23. These coils are lowered into place on the refrigerant supply and return via lines 26 and 27, respectively. Propane, which is commonly available in the oil field, can be used as the refrigerant. It has a boiling point of −43° F. at atmospheric pressure. A coil temperature of −30° F. can be obtained with propane. If lower temperatures are needed a fluid such as carbon dioxide, which boils at atmospheric pressure at −109.3° F. or nitrogen which boils at −320.4° F., or other liquefied gases as described above or in U.S. Patents 2,864,448 and 2,801,698 can be used.

The permanent plugging agent is injected through the treating tubing string 28 once the ice packers have formed an integral ice mass within the liner, annulus 29 and in or in contact with rock interstices of the surrounding earth formations, such as the production zone 30 penetrated by borehole 31. The treating tubing 28 is insulated as shown by 32 through the top ice plug. The twofold purpose of the insulation is to (1) avoid freezing a spacer fluid (such as alcohol) which is spotted ahead of the plugging agent and (2) prevent melting of the ice plug around the treating tubing by the relatively warm plugging agent and loss of isolation between the two top zones. The freezing coils 25 are attached to the tubing string 28 and, since they become imbedded in the ice plugs 22 that form around them, they serve the dual purpose of anchoring and cooling the ice plugs to keep the plugs in fixed positions and frozen during the injection of a permanent plugging material into the plug-isolated thief zone 23.

Variations of this scheme can be readily visualized for plugging bottom or top thief zones as shown in FIGURES 3 and 4. Although FIGURE 2 illustrates a water injection well, it should be applicable to a steam injector after cooling, for example, with sufficient water. Furthermore, it could be used in a producing well after overbalancing the bottom hole pressure with water and flushing residual oil from the borehole or using the residual oil as the freezing fluid.

A preferred method of permanently plugging thief zones after the oil-productive zone has been temporarily plugged or isolated by freezing by the process of this invention comprises the use of epoxy resins and consists in following the steps of (a) preparing a solution of a resin-forming epoxide having more than one vicinal epoxy group per molecule and an amine capable of acting as curing agent for said epoxide, and, optionally, a cure rate controlling compound, the resin-forming ingredients being present in a combined concentration of at least 20 percent by volume of said solution, and being selected to provide a system which remains a homogeneous solution of relatively low viscosity for a substantial period of time, sufficient to inject said solution into said formation, (b) injecting the solution into the pore space of a permeable formation to be treated, and (c) retaining the solution in the formation for a sufficient time to permit the solution to be converted to a gel which completely fills the pore space of the mass and to cure to a coherent, cross-linked resin mass.

The composition of the solution is selected such that the (a) resin-forming ingredients and partial reaction products remain dissolved until the solution has entered the formation to be plugged and thereafter react to form a gel which incorporates the solvent, and (b) the solution has a viscosity which is sufficiently low to permit it to be pumped into the formation in a reasonable length of time with available equipment.

The viscosity is usually selected to be below 100 centipoises at formation temperature.

The total amount of resin-forming ingredients, i.e., resin-forming polyepoxide, amine curing agent and cure modifying compound, is between 20 and 60 percent by volume of the solution, the remainder being hydrocarbon solvent. A preferred concentration range is between 30 and 45 percent.

Once the well has been properly prepared by the process of the present invention, any driving fluids may be used to aid in recovery of the oil and include steam and/or water which may contain surfactants such as ionic, cationic and/or non-ionic surfactants, e.g., sulfonates, polyalkoxy phenols, and the like, as well as hydrocarbons such as lower hydrocarbons and mixtures thereof and/or in situ combustion drives.

The foregoing description of the invention is merely intended to be explanatory thereof. Various changes in the details of the described method may be made, within the scope of the appended claims, without departing from the spirit of the invention.

I claim as my invention:

1. A method for recovering fluidizable material from underground formations having a non-productive permeable zone as well as a productive zone traversed by a borehole, comprising the steps of:
    (a) forcing into the borehole and into contact with the surrounding earth formation a freezable fluid;
    (b) withdrawing heat from the freezable fluid adjacent to the non-productive permeable zone of the formation by refrigeration means placed in the borehole so as to temporarily isolate the non-productive zone of the formation with a frozen solidified fluid while maintaining fluid communication between the non-productive permeable zone and a surface location;
    (c) reducing the rate at which heat is withdrawn when the frozen plug has isolated the non-productive permeable zone;
    (d) forcing through the borehole and into the non-productive permeable zone a plugging agent to permanently plug said zone;
    (e) unfreezing the frozen plug; and,
    (f) recovering fluidizable material from the productive zone.

2. The method of claim 1 wherein in step (a) the freezable fluid is water, the refrigeration of step (b) is accomplished by circulating a cooling fluid through conduits within the borehole and in step (d) the permanent plugging agent is a polyepoxy resin.

3. The method of claim 1 wherein the temporary frozen plug is formed in and around the liner of the borehole of an oil-productive zone wherein the frozen plug frozen water, said water being frozen by means of a refrigerating unit within the borehole placed at at least one depth other than but adjacent to the depth of the formation being temporarily plugged or isolated and wherein the refrigerant circulating in the refrigerating unit is a normally gaseous refrigerant at low pressures and the permanent plugging agent is a polyepoxy resin.

4. The method of claim 3 wherein the gaseous refrigerant is propane.

5. A method for recovering oil from underground formations having a thief zone and an oil-productive zone traversed by a well borehole having therein a refrigerating unit adjacent to the thief zone comprising the steps of:
 (a) injecting water into the formation;
 (b) ciculating a normally gaseous refrigerant through the refrigerating unit to freeze into a solid mass in the interval between an oil-producing formation and thief zone surrounding the liner of the well borehole so as to temporarily plug it but maintaining fluid communication with the thief zone;
 (c) plugging the thief zone with a permanent-plugging polyepoxy resin;
 (d) unplugging the temporary plugged area by thawing; and,
 (e) recovering oil from the oil-productive zone.

6. The method of claim 5 wherein the gaseous refrigerant is propane and the oil is recovered in step (e) by means of a waterflood.

References Cited

UNITED STATES PATENTS

| | | | |
|---|---|---|---|
| 2,777,679 | 1/1957 | Ljungstrom | 166—39 X |
| 2,787,325 | 4/1957 | Holbrook | 166—22 |
| 2,801,699 | 8/1957 | Sayre | 166—22 |
| 2,864,448 | 12/1958 | Bond | 166—39 X |
| 3,004,601 | 10/1961 | Bodine | 166—39 |
| 3,261,400 | 7/1966 | Elfrink | 166—30 |
| 3,301,326 | 1/1967 | McNamer | 166—39 X |
| 3,308,884 | 3/1967 | Robichaux | 166—33 |

NILE C. BYERS, Jr., Primary Examiner